United States Patent [19]
Herleth

[11] 3,940,792
[45] Feb. 24, 1976

[54] TAPE RECORDER, PARTICULARLY CASSETTE RECORDER

[75] Inventor: Karl Herleth, Munich, Germany

[73] Assignee: Uher Werke Munchen, Munich, Germany

[22] Filed: Feb. 27, 1974

[21] Appl. No.: 446,264

[30] Foreign Application Priority Data
Sept. 28, 1973  Germany............................ 2348941
Sept. 28, 1973  Germany............................ 2348940
Sept. 28, 1973  Germany............................ 2348938
Sept. 28, 1973  Germany............................ 2348939

[52] U.S. Cl. ................................................ 360/96
[51] Int. Cl.² ......................................... G11B 15/00
[58] Field of Search.......................... 360/60, 93, 96

[56] References Cited
UNITED STATES PATENTS

| | | | |
|---|---|---|---|
| 2,867,389 | 4/1966 | Viets | 360/96 |
| 2,933,319 | 5/1967 | Proctor | 360/96 |
| 3,352,977 | 3/1968 | Sheshone | 360/96 |
| 3,752,938 | 8/1973 | Ozawa | 360/60 |
| 3,753,567 | 8/1973 | Church | 360/60 |
| 3,785,658 | 1/1974 | Ikeoa | 360/60 |

Primary Examiner—Vincent P. Canney
Attorney, Agent, or Firm—Fleit & Jacobson

[57] ABSTRACT

A tape recorder, particularly a cassette recorder, comprising two reels for rewinding and unwinding a tape, sound recording and reproducing means, a driving system for moving the reels in two tape run directions, a braking system for the reels, control buttons (such as forward transport, pause, start, stop, record, rewind buttons) designed to set an appropriate function sequence for the recorder, and an electric control system which controls the given function sequence as a function of the actuated buttons. The control buttons are arranged at the front of the recorder and are assigned slides which extend over the length of the recorder unit containing the mechanical constituents such as tape-up spools, driving mechanism, as far as corresponding contacts of the electric control system. The setting movements of the control buttons can be transmitted to the corresponding contacts of the electric control system, and further, the slides are equipped with driving facilities and releasing facilities which move given mechanical recorder parts to the positions corresponding to the chosen function sequences.

27 Claims, 7 Drawing Figures

TAPE RECORDER, PARTICULARLY CASSETTE RECORDER

The invention relates to a tape recorder, particularly a cassette recorder, comprising two tape reels for rewinding and unwinding a tape, a driving system for moving the reels in two tape run directions, control buttons (for example for forwards, pause, start, stop, recording, reverse) designed to set an appropriate function sequence for the recorder, and an electric control system which controls the given function sequence as a function of the actuated control buttons which are arranged at the front of the recorder.

In a tape recorder, particularly a cassette recorder we distinguish between various function sequences. These recorder sequences include for example forward transport and tape reversal, the recording of sound information as well as start and stop for these operating sequences.

For the purpose of setting these individual operating sequences there are control buttons on the recorder which, when actuated, cut in corresponding circuits of an electric control system so that the desired function sequences of the recorder take place. To this end, the control system is connected in a suitable manner to the driving system for the tape reels and also for the systems which serve to record and reproduce the sound information.

In known tape recorders, particularly cassette recorders, the electric control system is so connected to the mechanical constituents of the tape recorder, comprising the tape reels, driving system, braking system, capstan, pinch roller, etc., that the electrical and mechanical parts of the tape recorder can be supplied and manufactured as one unit only. However, it is frequently desirable that differing control systems can be made usable for the mechanical part. This means that the electric part of the tape recorder can be manufactured independently of the mechanical part of the tape recorder and both parts are absolutely independent of each other at the manufacturing stage. This also enables one part to be exchanged for another.

When the reels of a tape recorder are being braked, great importance is attached to the fact that the tape does not form loops and is always guided tightly. The danger of loops being formed arises especially as a result of the drawing reel being slowed down too early or too sharply or as a result of varying braking forces being exerted on the tape reels.

The capstan against which the tape is pressed by a pinch roller during operation is connected to a relatively large centrifugal mass to ensure that the tape will run smoothly. During transportation there is a danger that, if the recorder is not handled properly, the connection between the centrifugal mass and capstan will be broken because great forces which may lead to the destruction of the capstan are exerted on said capstan by the centrifugal mass on the basis of its large mass when the recorder is dropped for example.

The object of the invention is to provide a tape recorder, particularly a cassette recorder, wherein the electric part of the recorder can be separated exactly from the mechanical part of the recorder so that the two of them can be exchanged as required for replacements without the operational readiness of the freshly assembled recorder being impaired.

A further object of the invention is therefore to provide a driving system with an electric motor for the tape reels of a cassette recorder, which system can be set with the aid of simple mechanical means to the above-named function sequences of the cassette recorder.

A further object of the invention is to show a braking system wherein the sound medium, that is to say the tape, is always guided tightly even when the brakes are applied.

The final object of the invention is to show a counter-support for the centrifugal mass which can intercept destructive forces originating from the centrifugal mass.

In the tape recorder of the type named at the beginning, particularly a cassette recorder, the invention is constituted by the fact that the settings of the control buttons can be transferred to the corresponding contacts of the electric control system via slides (such as forward transport, pause, start, stop, record and reversal slides) which extend over the length of the recorder part containing the take-up reels, driving mechanism, recording and reproducing devices, as far as said corresponding contacts of the electric control system, and by the fact that the slides are furnished with driving facilities and releasing facilities which move given mechanical recorder parts to the positions corresponding to the chosen function sequences.

The slides which can be shifted longitudinally by the control buttons thus project through the entire structural unit which houses the mechanical constituents of the recorder and project out of that side of the structural unit which is opposite to the control buttons.

The electric control system contacts to be actuated by the slides are thus arranged advantageously on that side of the structural unit which is opposite to the control buttons, said unit housing the mechanical constituents of the recorder.

To prevent the forward transport and reversal slides from being actuated simultaneously, said two slides can be coupled to each other in such a manner that, when one slide is actuated, the other slide is held in the OFF position. Here, when one slide is actuated, the other can move in the opposite direction.

These movements of the rewinding slide and forward transport slide can moreover be utilised advantageously to the extent that they produce a driving connection between the driving system and one or the other reel, depending on the function sequence which has just been set with the appropriate button on the recorder.

The sound recording and sound reproducing systems which consist mainly of the recording heads and reproducing heads as well as a pinch roller which can press the tape against a capstan, can be connected to the start slide in advantageous fashion. When the start button is actuated, the sound recording and reproducing systems are thus shifted simultaneously so that the magnetic heads are accordingly moved into contact with the tape and the pinch roller furthermore presses the tape against the capstan. In addition, when the start button is actuated, a corresponding contact of the electric control system is also operated via the start slide so that a voltage suitable for making the reels run slowly is applied to the driving system.

The tape record slide which can be shifted by the record button is so connected to a recording lock that the record slide cannot be moved by the record button until the record lock has been released. For in many cases it is not desired to record any other sound information, e.g. dictations or pieces of music, than the original pieces of music on a tape, especially on a tape in a cassette. In such cases, the record lock is not released when the tape or cassette is inserted into the recorder. This means that the record slide cannot be moved and is held in the locked position by the record lock.

In order to make the recorder independent of the electric control system with regard to the sequence of recording, the record slide is firmly connected to a Bowden control wire which actuates a corresponding cut-in contact of the electric control system when the record slide is shifted. This Bowden control wire is so designed at its free end that it can be moved into contact with any given contact.

All other control buttons can be reset to their neutral positions by the stop button. A tripping magnet which resets the control buttons automatically can also be provided to reset all the control buttons to their neutral positions.

The advantages of the invention are constituted by the fact that the electric control unit can be fully separated from the mechanical part of the recorder. This is achieved because the slides which extend across the entire length of the structural recorder unit which houses the mechanical part, both operate electric contacts of the control unit and take care of the appropriate displacement of the individual mechanical constituents of the recorder to the desired operating positions. In the tape recorder according to the invention, in conjunction with the structural unit which houses the mechanical constituents, use may thus be made of electric control units of different configurations. Thus the structural unit of the tape recorder which houses the mechanical constituents is independent of the structure of the electric control unit.

Further, the driving system may also have, according to the invention, a swivel plate, which is mounted rotatably on the housing, and slides which can be moved by means of control buttons. In addition, the corresponding contacts of the electric control system can be actuated by means of the slides so that, when the direction is reversed, the polarity of the electric motor is reversed accordingly. Owing to the shifting motion of the slides, the swivel plate can be swivelled so much that a friction wheel which is driven by the electric motor comes into friction-like contact with one of the driving plates.

The swivel plate is advantageously hinged to one of the slides in such a manner that the slide is able to over-travel move too far, relative to over-travel, or, the swivelling motion of the swivel plate. This enables the slide to describe a greater shifting movement than is necessary for the application of the friction wheel to one of the driving plates. The excess travel of the slide is intercepted resiliently. In addition, it is also possible that the control button which actuates the slide can engage in a lock as a result of the excess travel and be released again from said lock. Over and above that, this also enables the friction wheel to be applied resiliently against one of the driving plates.

To enable the slide to over travel, use may be made of a leg spring which engages on one of the slides. The two leg ends of the leg spring are designed guidably so that they can be deflected resiliently, which enables the friction wheel to be applied resiliently to the individual driving plate.

A slide for forward transport and a slide for rewinding can be provided which are hinged to the two legs of a swivel lever mounted rotatably on the housing. This enables one of the slides to be moved in the opposite direction to the movement of the other. Consequently, a given contact of the electric control system can easily be actuated by each lever end which is opposite the corresponding control button; this means that the polarity of the electric motor, for example, can be simply reversed.

In order to be able to set the motor to slow running, for example for the reproduction of sound information on the tape, the swivel plate to which the electric motor and friction wheel are fastened can be swivelled in the direction of one of the driving plates by means of a further slide which can be actuated by the slow-running tape control button so that the friction roller is applied to this driving plate. At the same time, a control system contact which applies the limited voltage necessary for slow running to the motor is actuated by means of said slide. The voltage can be limited by the electric control system, for example with the aid of transistors or resistors.

Further, in the braking system of the tape recorder according to the invention, both brake shoes are attached to a common brake slide which can be canted within a certain clearance so that the drawn reel is first slowed down when the brake shoes touch down.

Two points of engagement can be provided on the brake slide for this purpose so that the brake slide can be aimed at with a centre offset. The clearance necessary for canting can be obtained by guiding the slide on a pin which projects into an oblong recess.

In order to be able make the brake slide cant and pivot accordingly when the brake shoes lift up, use can be made of a lifting bracket which respectively engages on one of the two points of engagement and which can swivel around its two ends. Here, the lifting bracket can be pivoted accordingly by means of slides which engage on its two ends. The slides can be shifted by control buttons on the recorder.

The invention now ensures that during the braking sequence the drawn reel is slowed down earlier than the drawing reel so that the tape is always guided tightly between the reels. Consequently, no tape loops form and the danger of damage to the sound medium as a result of loop formation is eliminated.

Finally, a support being elastic in the direction of the axis of the centrifugal mass is provided for said axis in the tape recorder according to the invention. The support may take the form of a plastic part which runs in a slot guide on a bearing bridge.

The counter-support acts like a spring element and thus dissipates the kinetic energy of the centrifugal mass. When the centrifugal mass exerts great kinetic energy, said energy is intercepted at the outer periphery by the bearing bridge in which the plastic part is guided. This prevents said kinetic energy from exerting a destructive effect on the capstan. After the centrifugal mass has been intercepted, both the centrifugal mass and the capstan return to their starting positions as a result of the resiliently designed counter-support, that is to say the resiliently designed support. To this end, the capstan is guided in sliding fashion together with the centrifugal mass in a second bearing which is provided on the other side of the centrifugal mass.

An embodiment of the invention is represented in the attached drawings which serve to explain the invention in more detail.

Figure 1:
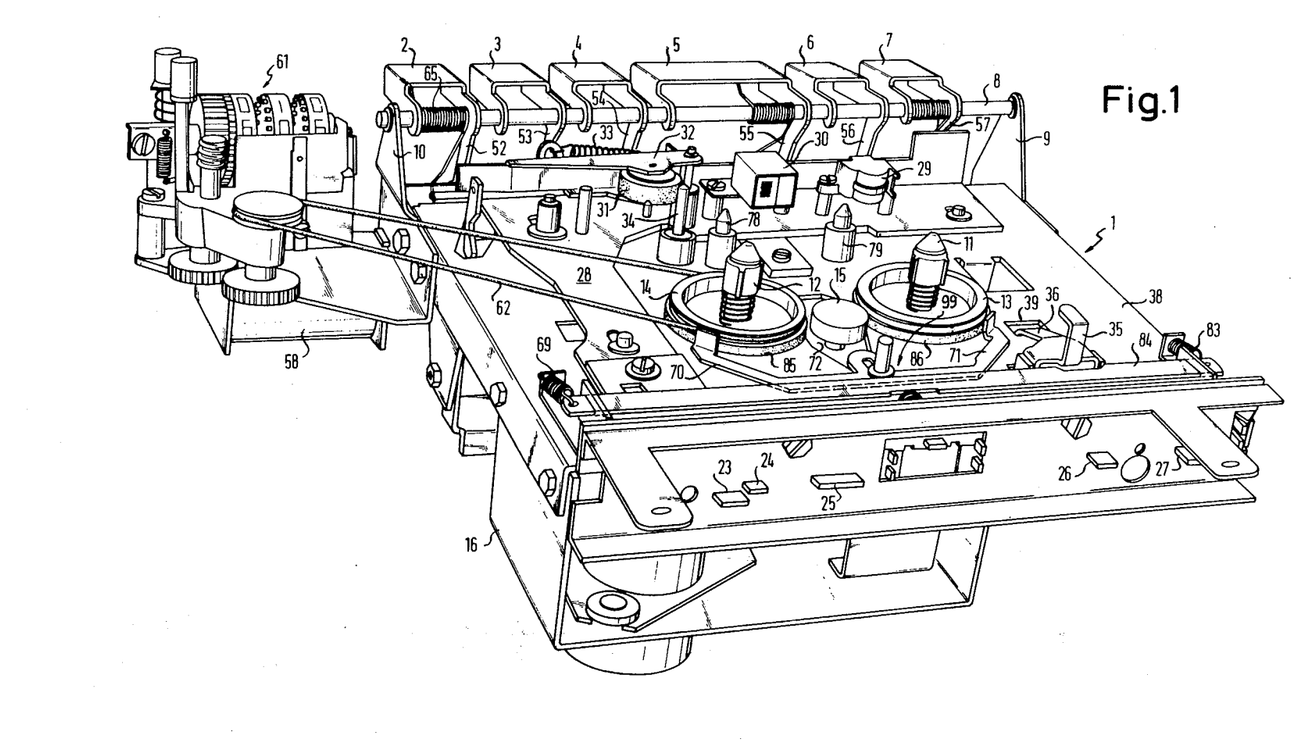
FIG. 1 shows a perspective top view of a structural unit which contains the mechanical part of the tape recorder according to the invention.
Figure 2:
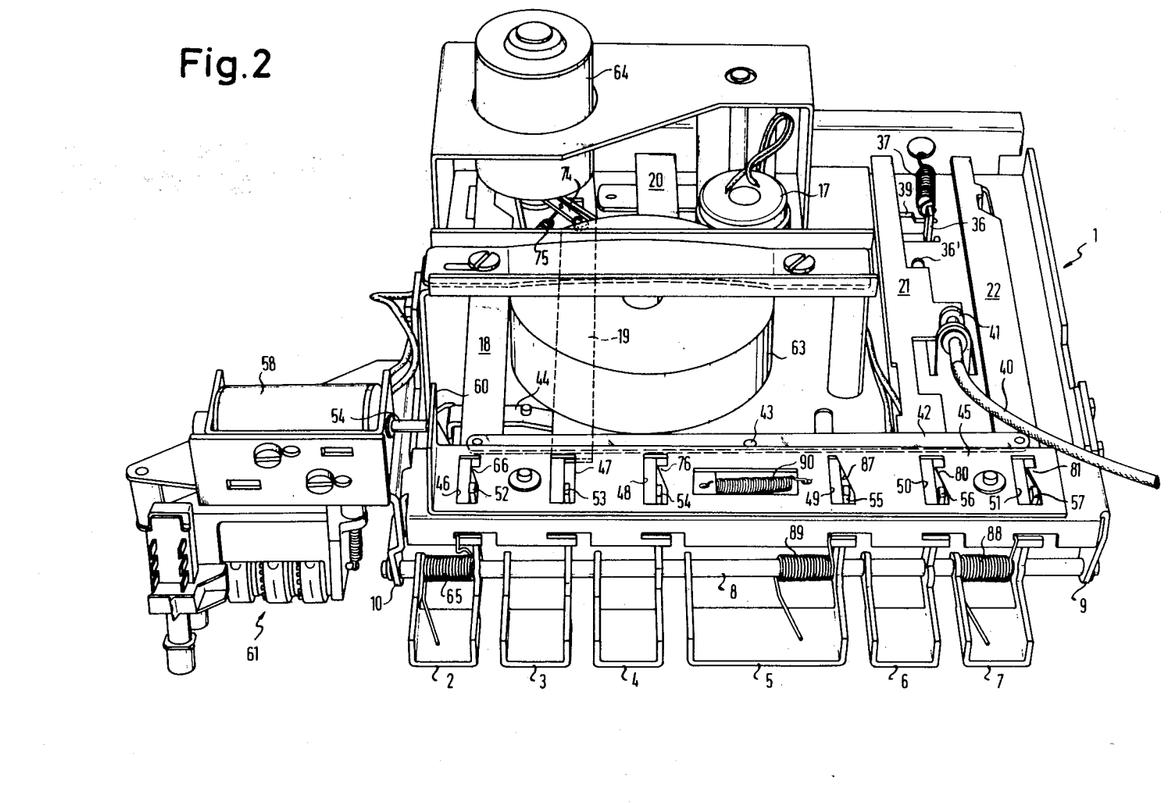
FIG. 2 shows a perspective bottom view of the structural unit according to FIG. 1.

Structural unit 1 which is illustrated in FIGS. 1 and 2 and houses the mechanical components of the tape recorder has the following constituents in the main. On the topside of housing 16 of structure 1 there are driving plates 13 and 14 which are so connected to spool core drivers 11 and 12 that they cannot turn separately. In addition, on the side which represents the front of the recorder there is a forward transport control button 2, a pause control button 3, a start control button 4, a stop control button 5, a record control button 6 and a rewind control button 7. These control buttons are seated on a shaft 8 which is mounted in control button holders 9 and 10. A clutch wheel 15 which is connected to driving motor 17 serves to drive driving plates 13 and 14 as well as spool core drivers 11 and 12. Both clutch wheel 15 and driving motor 17 are able to pivot.

Corresponding slides are in active contact with control buttons 2–7. A forward transport slide 18 can be actuated by forward transport button 2, a pause slide 19 by pause button 3, a start slide 20 by start button 4, a record slide 21 by record button 6, and a rewind slide 22 by rewind button 7. The free ends of slides 18–22 stand out at that side of structural unit 1 which is opposite to control buttons 2–7. The free end 23 of forward transport slide 18, the free end 24 of pause slide 19, the free end 25 of start slide 20, the free end 26 of record slide 21 and the free end 27 of rewind slide 22 can be recognized in FIG. 1. Corresponding contacts of the electric control system can be actuated by said free ends.

Further, a movable plate 28 to which recording head 29 and reproducing head 30 are attached is also provided in structural unit 1 for the mechanical constituents of the recorder. In addition, a pinch roller 31 which is carried by a swivel lever 32 is also provided on movable plate 28. Said swivel lever 32 is fastened at one end to the movable plate 28 so that pinch roller 31 can swivel on the movable plate. In addition, a spring 33 which presses the pinch roller 31 fastened to swivel lever 32 in the direction of a capstan 34, is engaged on swivel lever 32. Spring 33 is moreover hinged to housing 16 of structural unit 1.

Capstan 34 is connected to centrifugal mass 63 which is driven by a motor 64.

Further, FIGS. 1 and 2 also show a record lock 35 which is fastened pivotally to the upper part of structural unit 1. A locking lever 36 of said record lock 35 is forced by the pressure of a spring 37 which is similarly fastened to the housing, through an opening 39 in a base plate 38 of the housing. Said locking lever 36 engages with its front end 36′ on a shoulder of the record slide and holds the record slide in the locked or switched-off position shown in FIGS. 1 and 2.

In addition, a Bowden control wire 40 of which one end 41 is firmly connected to record slide 21 can be seen in FIG. 2 in particular.

Further, a two-arm swivel lever 42 is provided to whose two free ends are hinged forward transport slide 18 and rewind slide 22. Swivel lever 42 is mounted in the middle by means of a holder 43 on the housing of unit 1.

A swivel arm 44′ of a swivel lever 44 can be so actuated with pause slide 19 that it can pivot swivel lever 32 on movable plate 28 against the force of spring 33.

Further as shown in FIG. 2, a movable plate 45 extending transversely to slides 18–22 is provided which has openings 46–51 into which project swivel arms 52–57 connected to control buttons 2–8. By the actuation of stop button 5 this slide can be shifted against the force of a spring 90.

In addition, a tripping magnet 58 which can similarly serve to shift movable plate 45 is also shown in FIG. 2. Here, said magnet 58 engages by means of a pin 54 on a stop surface 60 of movable plate 45. Further as shown in FIG. 1, a counter 61 which is connected with driving plate 14 via a belt drive 62 represented in FIGS. 1 and 2.

The mode of operation of the individual slides and control buttons is as follows.

Figure 3:
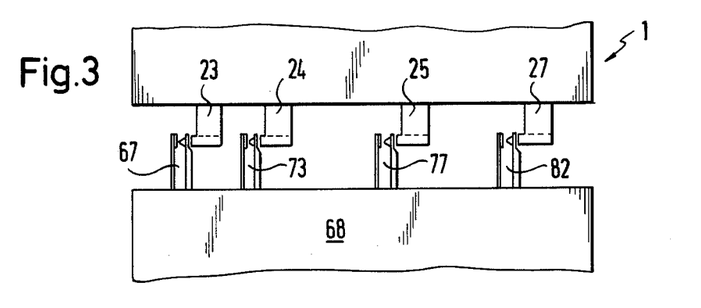
FIG. 3 is a diagrammatic view of the structural unit which contains the mechanical part of the recorder as well as the electric control unit.

When forward transport button 2 is pressed down against the force of a spring 65, slide 18 is moved with its end 23 out of that side of the housing which is opposite to the control buttons. Forward transport button 2 is pressed down against the force of a spring 65 until swivel arm 52 catches on nose 66 of opening 46 in movable plate 45, namely on account of the restoring force of spring 90. Slide 18 thus stays in its shifted position where it actuates a contact 67 of control system 68 which may be of any known type and which is therefore represented only in diagramatic form in FIG. 3. At the same time as shown in FIGS. 1 and 2, the displacement of forward transport slide 18 against the force of a spring 69 which is fastened at one end to base plate 38, causes a braking system 70, 71 to be raised off the two driving plates 13 and 14 so that the latter can turn. In addition, clutch wheel 17 is applied to driving plate 14; driving motor 64 for capstan 34 and driving motor 17 for the reels which are not shown in more detail and can be placed onto spool core drivers 11 and 12 are then supplied accordingly with voltage by control system 68 and driven as a result of the actuation of contact 67 (FIG. 3). For the purpose of swivelling motor 17 and clutch wheel 15, these two components are mounted on a swivel plate 72 which is in contact with forward transport slide 18 via a lever not shown in greater detail. Said plate 72 is accordingly swivelled when slide 18 is shifted so that clutch wheel 15 is applied resiliently to driving plate 14.

When pause button 3 is actuated, pause slide 19 is similarly shifted in such a manner that its free end 24 emerges from that side of structural unit 1 which is opposite to the control buttons. A contact 73 of control unit 68 (FIG. 3) is similarly actuated; this contact temporarily stops the function sequence which has just been set.

When pause slide 19 is shifted, swivel lever 44 is so swivelled that its swivel arm 44′ comes into contact with swivel arm 32 and so shifts the latter against the force of spring 33 that pinch roller 31 is moved away from capstan 34. This causes the tape drive to be stopped. When the pause button is pressed again, lock 74 for pause slide 19 is released and pause slide 19 is moved back by a spring 75 to its starting position; this also causes pause button 3 to move back to its starting position.

When the start button is actuated, it is pressed until swivel lever 54 catches on nose 76 in opening 48 in movable plate 45. Lever 54 serves to push start slide 20 also out of that side of structural unit 1 which is opposite to the control buttons. One end 25 of start slide 20 then actuates a contact 77 of control unit 68 (FIG. 3), causing the correspondingly chosen function sequence to be set in motion.

At the same time as start slide 20 is shifted, movable plate 28, on which recording head 29 and reproducing head 30 as well as pinch roller 31 are mounted, is shifted in the same direction as slide 20. To this end, slide 20 is connected to movable plate 28, for example by means of a pin not shown in further detail. This shifting of plate 28 causes pinch roller 31 to be shifted in the direction of capstan 34 and, in addition, recording head 29 and reproducing head 30 are moved in the direction of guiding facilities 78 and 79 for the tape. At the same time, contact 77 (FIG. 3) of control system 68 is actuated so that a voltage which is reduced relative to forward transport and rewinding is applied to the driving system and the driving motors are operated at the slow-running speed.

With reference to FIG. 2, record button 6 cannot be actuated until record lock 35 has been released. This can be achieved for example in that a device known per se, which is able to swivel locking lever 36 of record lock 35, is provided on the cassette inserted in the recorder. As a result of this swivelling motion, locking lever 36 disengages with its end 36' from the shoulder of record slide 21 so that the slide can be shifted by pressing record button 6. Here, record slide 21 is pushed swivel lever 56 on record button 6 catches on a nose 80 of opening 50 in movable plate 45. Record slide 21 is shifted by swivel lever 56 in the same direction as has been described above. In this shifting motion one end 41 of Bowden control wire 40 is also taken along, causing the electronic system — not shown in further detail — of the recording unit to be switched on. The use of this Bowden control wire enables the mechanical part to be made independent of a special electronic recording system.

When rewind button 7 is pressed down against the force of spring 88 until swivel lever 57 on rewind button 7 catches on a nose 81 of opening 51 in movable plate 45, rewind slide 22 is similarly pushed by swivel lever 57 out of that side of structural unit 1 with its end 27 which is opposite to the control buttons. End 27 of rewind slide 22 thus actuates a contact 82 of control system 68, causing the rewinding sequence to be fed into the control system in appropriate fashion. When rewind slide 22 is shifted, braking system 70, 71, (FIG. 1) is raised and released — in the same way as when forward transport slide 18 is shifted — from driving plates 13 and 14 against the force of a spring 83 via linkage 84 which is connected to rewind slide 22. In addition, motor 17 is swivelling with clutch wheel 15 as a result of the swivelling of swivel plate 72. As a result of this swivelling action, clutch wheel 15 is moved into contact with driving plate 13.

When the stop button 5 is actuated, and when swivel lever 55 is subsequently swivelled, movable plate 45 in FIG. 2 is shifted to the right against the force of magnet 58 as a result of an obliquely extending edge 87 in opening 49 in movable plate 45 which is resting against swivel lever 55 of stop button 5. This causes the locked swivel levers of the pressed control buttons to be released from the locks in the various openings so that said buttons and the associated slides can move back to their starting positions. Attention is also drawn to the fact that both the rewind button and stop button can be actuated against the force of springs 88 and 89.

In addition, movable plate 45 can be moved to the right against the force of spring 90 by moving pin 54 on magnet 58 to the right so that this also enables the pressed buttons and the associated slides to return automatically to their starting positions.

When forward transport slide 18 or rewind slide 22 is actuated, the other slide respectively is held in the "switched-off" position, being pushed in the opposite direction. This is done with the aid of two-arm swivel lever 42 (FIG. 4) having slides 18 and 22 hinged to the ends thereof.

Figure 4:
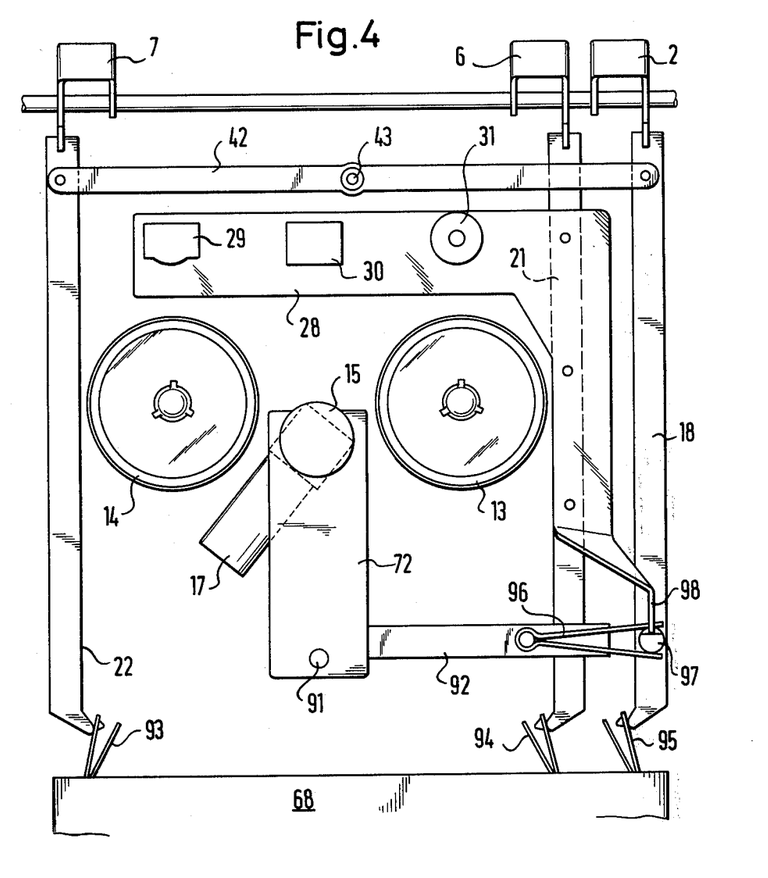
FIG. 4 is a perspective view of the essential parts of the driving system which can be installed in a cassette recorder.
Figure 5:
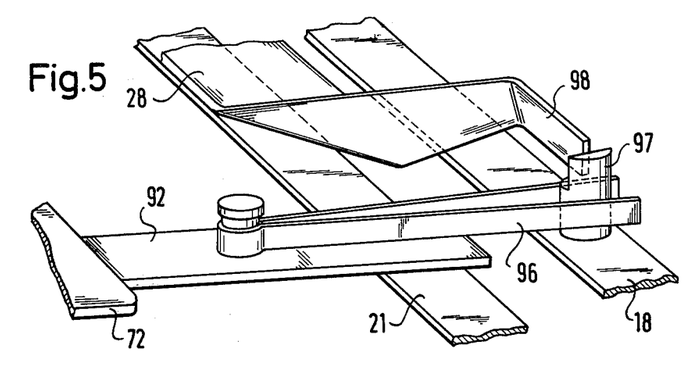
FIG. 5 is a partial view of the driving system showing the hinging of the swivel plate to one of the slides.

The driving system for the two reels is shown in detail in FIGS. 4 and 5. The drawings show driving plates 13 and 14 of the tape recorder onto which the reels of a tape cassette can be placed. These reels are not shown in detail. Further, the drawings also show swivel plate 72 on the top side of which friction or clutch wheel 15 is arranged. Said friction wheel 15 is driven by electric motor 17 which is arranged on the underside of swivel plate 72. Said friction wheel 15 is advantageously driven directly. The swivel plate is so mounted that it can turn around a pivot 91 which is fastened to the housing of the recorder. The swivel plate furthermore has a lever arm 92 which extends in the direction of one of the slides. In the embodiment shown here, the slide concerned is the forward transport slide 18 with which the forward transport of the tape can be programmed when control button 2 is pressed.

Further, there is also rewind slide 22 which can be shifted by control button 7 and serves to set the cassette to rewind. The two slides 18 and 22 for forward transport and rewind are connected together via a two-arm swivel lever 42, i.e. these two slides are hinged to the two lever arms of said swivel lever 42. Swivel lever 42 can pivot around swivel axis or holder 43 which is mounted firmly on the housing.

Further, slide 21 is also represented which can be shifted by means of a control button 6 and serves to set the slow-running sequence, that is to say the speed which is desired for recording or for the reproduction of the sound information recorded on the tape.

Further, electric control system 68 as well as contacts 93, 94 and 95 on said electric control system are represented diagrammatically. Naturally, these contacts may be the same as those represented in FIG. 3. In this connection reference is made to the fact that several contacts can be actuated simultaneously by each slide end. Said contacts 93 to 95 are so arranged that they can be actuated, for example closed, by the ends of slides 22, 21 and 18 which are opposite control buttons 7, 6 and 2.

Further, it is also evident that lever 92 of swivel plate 72 is hinged to slide 18 via a leg spring 96. The leg spring is so arranged here that its ends which engage on an elevation 97 of slide 18 can be forced resiliently outwards.

In addition, slide 21 engages on elevation 97 of slide 18 via plate 28 which is connected rigidly to slide 21 and on which sound heads 29 and 30 are mounted. This means that, even when slide 21 alone is actuated, i.e. when control button 6 for slow-running or reproduction is actuated alone, the friction wheel is moved into friction-like contact with driving plate 13 provided for that purpose.

The following remarks concern the mode of action of the device. When control button 2 is pressed down, slide 18 is moved in the direction of control system 68 so that contact 95 provided for this purpose makes, causing the polarity of electric motor 17 to be reversed accordingly. In addition, swivel plate 72 is swivelled in the direction of driving plate 13 via leg spring 96 and lever 92 so that friction wheel 15 is applied against the periphery of driving plate 13. Slide 18 is allowed to over-travel by leg spring 96 so that control button 2 can be pressed down until it catches in a lock, moreover one of the legs of leg spring 96 is bent outwards by a small amount so that friction roller 15 rests against driving plate 13 subject to spring tension.

When slide 18 is shifted in such a manner, slide 22 is moved in the opposite direction as a result of two-arm swivel lever 42 so that it has moved away from contact 93 and the latter cannot cause electric motor 17 to be given the wrong polarity. As control button 2 is set in a lock, the recorder cannot be actuated incorrectly because control button 7 cannot be depressed either on account of the lock. The forward transport of the cassette recorder is set in this manner.

An analogous procedure takes place when control button 7 is pressed to rewind the tape. Switch 93 is then closed so that the polarity of electric motor 17 is reversed accordingly; and, as a result of the opposite motion of slide 18 which is transmitted by two-arm lever 42, swivel plate 72 is swivelled in the direction of driving plate 14 with which friction wheel 15 comes into contact. Here, too, the friction wheel is in contact subject to spring tension because one end of leg spring 96 is deflected resiliently on account of the excess travel of slides 18 and 22, respectively.

When control button 6 is actuated, slide 21 is shifted in the direction of contact 94 so that the latter makes. Here, a reduced voltage is applied to electric motor 17, and at the same time, plate 72 is caused to swivel by means of plate 28 on which heads 29 and 30 and pinch roller 31 are mounted and which is connected rigidly to slide 21. This swivel results from the fact that plate 28 engages with a prolongation 98 on elevation 97 on slide 18, thus both displacing slide 18 and swivelling plate 72 accordingly via leg spring 96 and lever 92. Because one end of slide 21 touches contact 94, causing the latter to make for example, aa reduced voltage is applied to the electric motor, and owing to the fact that one end of slide 18 comes to rest on contact 95, causing the latter to make for example, the polarity of electric motor 17 is reversed accordingly. This enables the driving system to be correspondingly set in simple fashion by means of a single manipulation.

Figure 6:
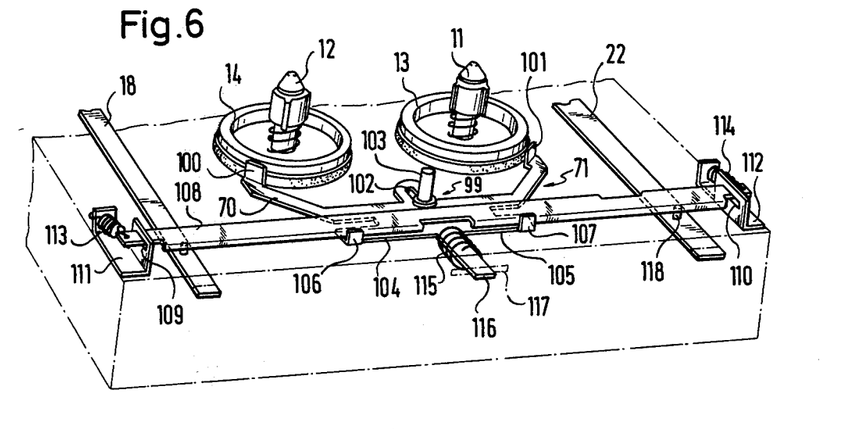
FIG. 6 shows a braking system according to the invention.

The braking system represented in FIG. 6 has a brake slide 99 having two arms 70 and 71 on which two brake shoes 100 and 101 are seated. Said brake shoes can be applied to driving plates 13 and 14 of the tape recorder so that the reels are slowed down; these reels are not shown in further detail and are mounted on spool core drivers 11 and 12.

Brake slide 99 has an oblong recess 102 into which projects a pin 103 being attached to the recorder. Said pin 103 and oblong recess 102 in brake slide 99 form the support for the brake slide, and the clearance necessary for canting the brake slide abd brake shoes 100 and 101 is moreover provided by oblong recess 102.

Further, brake slide 99 also has arms 104 and 105, the ends 106, 107 of which are bent over so that they form center offset points of engagement. Bent ends 106 and 107 engage a lifting bracket 108 which is mounted in slots 109 and 110 of guide plates 111 and 112. Guide plates 111 and 112 are fastened to the housing of the recorder. Lifting bracket 108 is guided, close to its two ends, in slots 109 and 110 in the guide plates. Springs 113 and 114 which draw the lifting bracket in the direction of driving plates 13 and 14 engage on the lifting bracket ends projecting beyond slots 109 and 110 so that with regard to the neutral position the lifting bracket is resting in slots 109 and 110 at the edge facing towards the front of the recorder.

In this position, brake shoes 100 and 101 are in the braking position. The shoes are pressed against driving plates 13 and 14 by the force of a spring 115. A prolongation 116 of the brake slide is guided in spring 115. The end of said prolongation projects into a guide slot 117 in the housing. This also ensures that brake slide 99 together with its two brake shoes 100 and 101 can be lifted off driving plates 13 and 14 at an inclined angle.

For the purpose of lifting brake shoes 100 and 101 off driving plates 14 and 13, use is made of slides 18 and 22 which can be shifted by the control buttons at the front of the recorder; said buttons are not shown in further detail. Slide 22 is shifted when tape rewind is set. This causes the slide to be shifted in the direction of the back of the recorder, and an elevation, especially a pivot 118, on slide 22 engages on lifting bracket 108 and swivels it against the force of spring 114 inside slot 110 in guide plate 112 around one edge of guide slot 109 in guide plate 111 to which lifting bracket 108 is drawn by spring 113. Owing to the swivelling of lifting bracket 108, this bracket engages on the bent end 106 of arm 104 on brake slide 99 and lifts brake shoes 101 and 100 of driving plates 14 and 13.

In the event that the reels are to be braked towards end of tape, slide 22 is moved back to its neutral position by the actuation of the control button, i.e. the slide moves in the direction of the front of the housing, the lifting bracket being swivelled back to its neutral position by the force of spring 114 and brake slide 99 being moved in the direction of driving plates 13 and 14 as a result of the force of spring 115. On account of the canted position of brake slide 99, brake shoe 100 first comes into contact with driving plate 14 so that plate 14 is braked before plate 13. This ensures that the tape is guided tightly between the two reels on being rewound or braked, because the drawn reel is on driving plate 14 and the drawing reel on driving plate 13 when the tape is being rewound. After brake shoe 100 has come into braking contact with driving plate 14, brake shoe 101 which is offset by a slight amount, in time, comes into braking contact with driving plate 13.

When the tape is being transported forwards, the drawing reel is seated on driving plate 14 and the drawn reel on driving plate 13. This forward transport step is initiated by the appropriate displacement of slide 18, lifting bracket 108 being swivelled around the end which is mounted in guide plate 112. The processes of lifting brake shoes 100 and 101 off driving plates 13 and 14 and of re-applying them when slide 18 is returned to its neutral position are analogous to those already described above.

Figure 7:
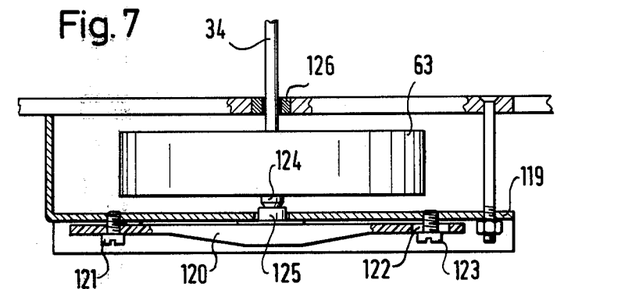
FIG. 7 shows a support for the centrifugal mass.

FIG. 7 shows centrifugal mass 63 as well as its support in detail which is connected to capstan 34. The counter-support of said centrifugal mass 63 is housed in a bearing bridge 119. The counter-support takes the form of plastic strip 120 which is fastened on one end to bearing bridge 119 by means of a screw 121. The other end of plastic strip 120 is designed in sliding fashion, and a guide slot 122 through which a screw 123 projects is provided in the plastic strip for this purpose. Plastic strip 120 is designed elastically and yields resiliently when loaded by centrifugal mass 63. Axis 124 of the centrifugal mass is supported here by an elevation 125 of plastic strip 120. Said elevation 125 projects through a hole in bearing bridge 119. If the load produced by the centrifugal mass is much too great (this may occur for example when the recorder is dropped or thrown) plastic strip 120 will bend or yield resiliently so that centrifugal mass 63 comes to rest on bearing bridge 119. This ensures that no forces will have a detrimental effect on capstan 34 and centrifugal mass 63 is prevented from breaking away from the capstan. It should also be pointed out that the capstan is guided in sliding fashion in a bearing 126. This bearing is situated on the chassis of the recorder or on a base plate of the housing.

I Claim:

1. A tape recorder, particulalry a cassette recorder, comprising a recorder housing, said recorder housing comprising therein tape reels for rewinding and unwinding a tape, sound recording and reproducing means, a driving system for moving the reels in two tape run directions, control buttons designed to set an appropriate function sequence of an associated electric control system having contacts corresponding to said control buttons and which controls the given function sequence in accordance with the setting of said control buttons, the control buttons being arranged on one side of said recorder housing, slides positioned on said recorder housing and which extend thereacross, mechanically connecting said control buttons to said electric control system contacts transmitting the setting movements of said control buttons to the corresponding contacts of the electric control system, said slides having driving facilities and releasing facilities which move given mechanical recorder parts to the positions corresponding to the function sequences corresponding to the setting of said control buttons, a braking system for the reels including means for mounting said braking system on the recorder and means for connecting said braking system to the slides so that the braking system is actuated by selected settings of the slides.

2. The tape recorder of claim 1, wherein the electronic control system contacts to be actuated by the slides are arranged on that side of the recorder housing containing the mechanical components.

3. The tape recorder of claim 1, wherein said control buttons and slides include a forward transport function and a rewind function and further comprising locking means which hold, when said forward transport function or rewind function is selected, the slide corresponding to the other one of the functions in a "switched-off" position.

4. The tape recorder of claim 3, wherein the locking means have a swivel lever on which the rewind slide and forward transport slide are hinged so that when one of the slides is actuated, the other one is shifted in the opposite direction and stopped.

5. The tape recorder of claim 1, including means for coupling the driving system to both the forward transport slide and rewind slides so that when a forward or rewind function is selected, the driving system is caused to establish a driving connection with one of the two reels.

6. The tape recorder of claim 1, including means for connecting sound recording and reproducing slides to the start slide so that when the start button is actuated, said sound recording and reproducing slides are shifted to the corresponding position by the start slide and further including a contact of the electric control system which is actuated by said control buttons and which applies a reduced voltage to the driving system for the reels.

7. The tape recorder of claim 1, including means for connecting the record slide to a record lock so that the record slide cannot be shifted by the record button until said record lock has been released.

8. The tape recorder of claim 7, comprising a Bowden control wire which is connected to the record slide, a corresponding out-in contact of the electric system for recording operated via the Bowden control wire.

9. The tape recorder of claim 1, comprising resetting means which reset, when the stop button is actuated, all the other buttons as well as the assigned slides to neutral positions.

10. The tape recorder of claim 9, wherein the resetting means comprise a tripping magnet.

11. The tape recorder of claim 9, wherein the resetting means have a movable plate defining recesses into which the control buttons engage, said movable plate being movable both by said stop button and by said tripping magnet.

12. The tape recorder of claim 1, further including a swivel plate, an electric motor and a friction wheel driven by said electric motor all mounted on said swivel plate, said driving system including driving plates, the swivel plate being pivotally mounted on the recording housing and can be swivelled by the shifting movement of the slides so that said friction wheel comes into contact with one of the driving plates, corresponding contacts of the electric control system being simultaneously so actuated by the slides so that the electric motor is given the corresponding polarity and the supply voltage of said motor is set accordingly.

13. The tape recorder of claim 12, further including a hinge on said swivel plate so that one of the slides is enabled to overtravel relative to the swivelling movement of the swivel plate.

14. The tape recorder of claim 13, further including a leg spring engaged between one of the slides and said swivel plate.

15. The tape recorder of claim 4, wherein, for the purpose of polarizing the electric motor appropriately, those ends of the forward transport and rewind slides which are opposite to the forward transport and rewind buttons actuate a corresponding contact of the control system.

16. The tape recorder of claim 15, including a further slide coacting with the control button and which can be shifted thereby making the tape run slowly, for example for playback, and which enables the swivel plate to be swivelled in the direction of the driving plate for forward transport until the friction wheel comes into contact with said swivel plate, a contact of the control system being simultaneously actuated by means of this further slide so that the voltage necessary for slow-running is applied to the motor and further, the forward transport slide is jointly shifted at the same time by said further slide so that the contact for reversing the polarity of the electric motor is also actuated.

17. The tape recorder of claim 14, wherein the two ends of the leg spring can be bent resiliently as a result of the over-travel of the slides.

18. The tape recorder of claim 14, including a shoulder on the leg spring which engages the forward transport slide and a slide which controls slow-running of the machine.

19. The tape recorder of claim 14, wherein the friction wheel can be applied resiliently to the individual driving plate by means of the leg spring.

20. The tape recorder of claim 1, including brake shoes which can be applied to the driving system and a common cantable brake slide mounting said brake shoes for selectively drawing said reels into braking engagement with said brake shoes.

21. The tape recorder of claim 20, including two points of engagement provided on the brake slide so that the brake slide can be aimed at with centre offset.

22. The tape recorder of claim 21, including a pin on the brake slide for guiding said brake slide.

23. The tape recorder of claim 21, further including a lifting bracket which is able to engage on at least two points of engagement on the brake slide and which can swivel around both its ends.

24. The tape recorder of claim 20, wherein the brake slide is shiftable to the non-braking position against spring force.

25. The tape recorder of claim 20 wherein two of the slides engage respectively close to one of the ends of said lifting bracket to swivel said lifting bracket around the other end.

26. The tape recorder of claim 1, wherein the structural unit having the mechanical components further includes a centrifugal mass and a capstan connected thereto, a pinch roller for pressing the magnetic tape against said capstan.

27. The tape recorder of claim 26, including a bearing bridge and a support having a profiled plastic part which runs in a slot guide on said bearing bridge.

* * * * *